United States Patent

[11] 3,542,415

| [72] | Inventor | Rudy J. Ratcliff<br>234 N. Ann St., Marengo, Illinois 60152 |
|---|---|---|
| [21] | Appl. No. | 705,396 |
| [22] | Filed | Feb. 14, 1968<br>Continuation-in-part of application Ser. No. 673,731, Oct. 9, 1967, abandoned. |
| [45] | Patented | Nov. 24, 1970 |
| [73] | Assignee | Ratcliff Industries, Inc.<br>Marengo, Illinois<br>a corporation of Illinois |

[54] APPARATUS FOR RAISING AND LOWERING A TELESCOPIC TRAVEL TRAILER
9 Claims, 7 Drawing Figs.

[52] U.S. Cl. ........................................... 296/27, 188/82.84
[51] Int. Cl. .......................................... B60p 3/34
[50] Field of Search ............................ 296/26, 27, 23(.3), 23; 254/148, 175; 188/82.84, 73, 80, 82.2, 82.3, 82.34, 82.84

[56] References Cited
UNITED STATES PATENTS

| 1,462,814 | 7/1923 | McKinley ..................... | 298/19X |
| 1,563,640 | 12/1925 | McCormick ................ | 298/19(V) |
| 3,273,934 | 9/1966 | Hagenson .................... | 296/26 |
| 1,639,962 | 8/1927 | Pfiffner ........................ | 254/148 |
| 2,767,013 | 10/1956 | Spears ......................... | 296/23X |
| 3,323,778 | 6/1967 | Baker .......................... | 296/27 |

FOREIGN PATENTS

| 832,737 | 7/1938 | France ........................ | 293/23(.3) |
| 14,568 | 0/1891 | Great Britain ............... | 188/82.84 |
| 275,829 | 8/1927 | Great Britain ............... | 296/23(.3) |
| 271,388 | 5/1927 | Great Britain ............... | 296/26 |

Primary Examiner—Richard J. Johnson
Attorney—Andrus, Sceales, Starke & Sawall

ABSTRACT: The invention relates to a telescopic travel trailer including an upper trailer section which can be telescoped vertically with respect to a lower trailer section. The upper trailer section is raised and lowered by manual rotation of a handwheel operating through a cable system. A brake or sprag roller is mounted on a hand lever pivotally connected to the frame of the trailer. The roller is adapted to freely ride on the periphery of the handwheel when the wheel is turned in a direction to raise the upper trailer section, and the roller is arranged to automatically engage the wheel as a sprag when turning of the wheel is stopped to thereby hold the upper trailer section in a given raised position.

By moving the lever to a neutral position the handwheel can rotate freely in either direction, and by pivoting the hand lever upwardly pressure can be applied through the roller against the periphery of the handwheel to slow down the descent of the upper trailer section.

Patented Nov. 24, 1970
3,542,415
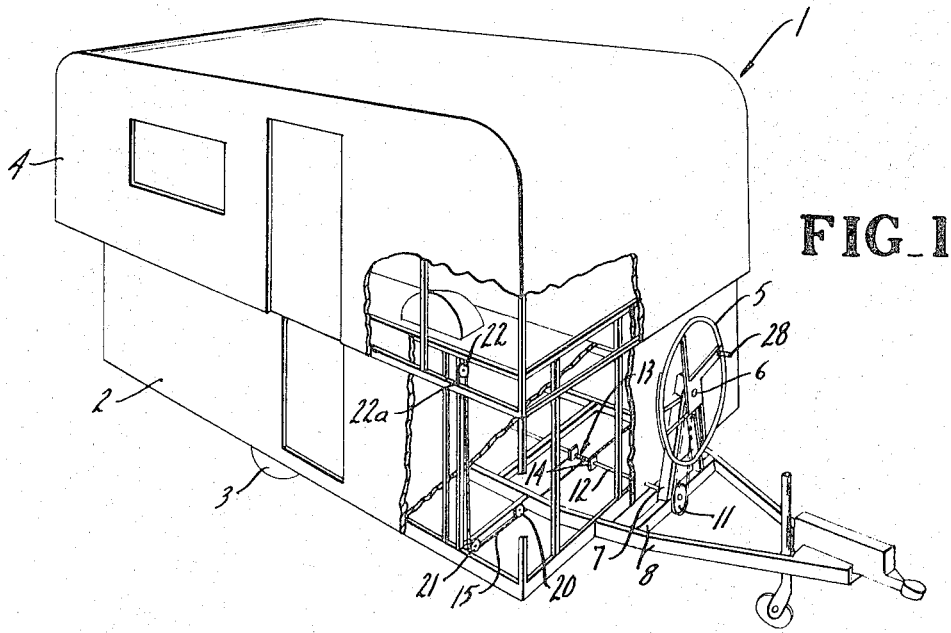
FIG_1
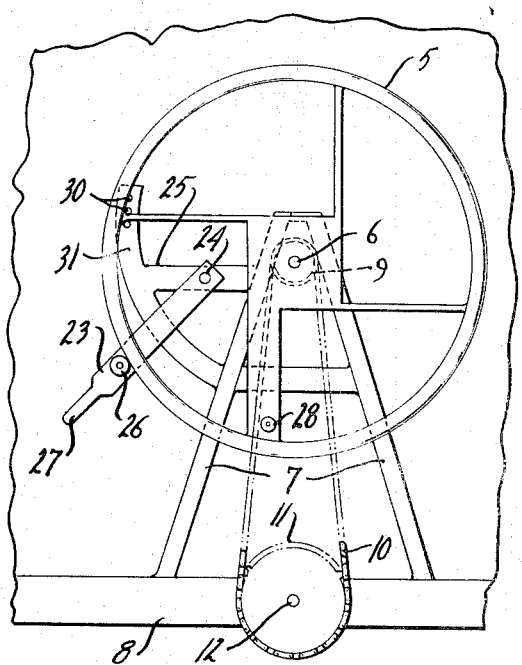
FIG_2
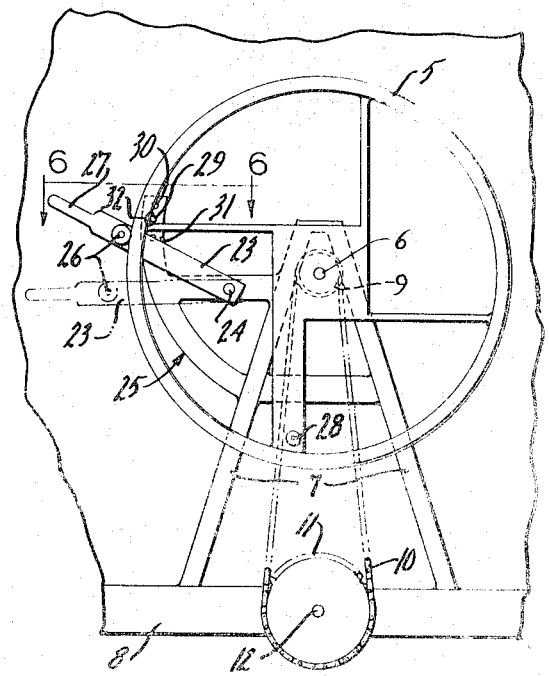
FIG_3
INVENTOR.
RUDY J. RATCLIFF
BY
Andrus & Starke
Attorneys

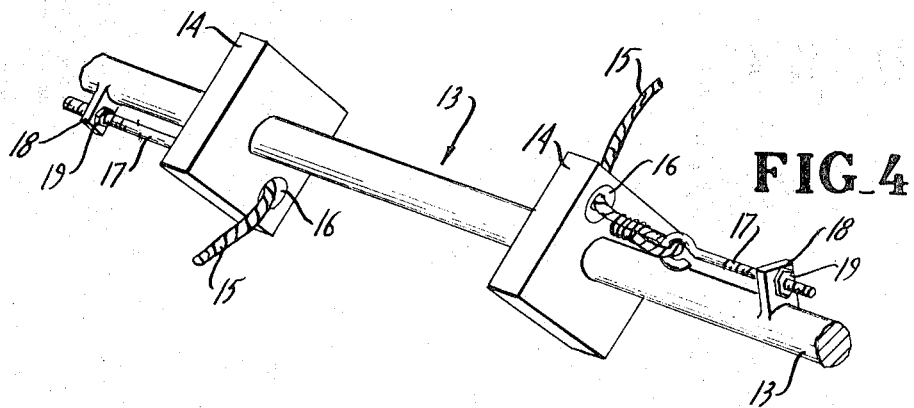
FIG_4
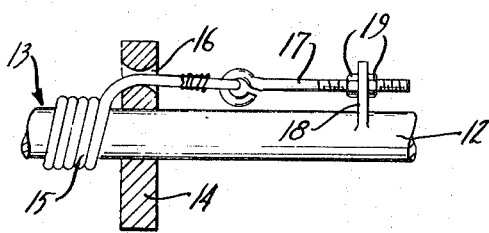
FIG_5
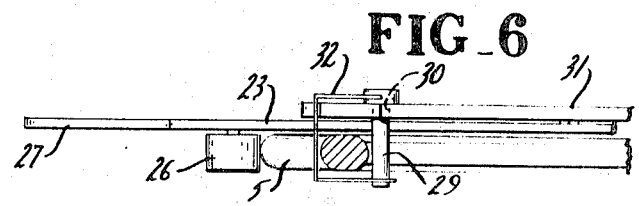
FIG_6
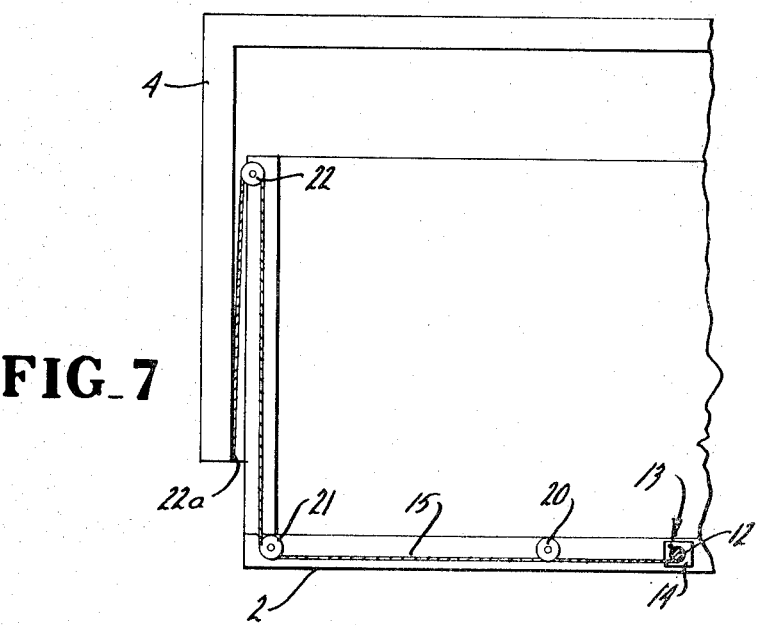
FIG_7
INVENTOR.
RUDY J RATCLIFF
BY
Andrus & Starke
Attorneys

APPARATUS FOR RAISING AND LOWERING A TELESCOPIC TRAVEL TRAILER

This application is a continuation-in-part of U.S. Pat. application, Ser. No. 673,731 filed Oct. 9, 1967 now abandoned and entitled Handwheel Brake.

A telescopic or high-low travel trailer includes a lower trailer section and an upper trailer section which telescopes vertically with respect to the lower section from a retracted position for transporting to an upper position for camping. The present invention relates to a mechanism for raising and lowering the upper trailer section of a telescopic travel trailer. According to the invention, a handwheel is mounted for rotation on a column supported on the frame of the lower trailer section, and rotation of the handwheel acts through a chain drive to rotate a shaft extending longitudinally of the trailer beneath the lower trailer section. The shaft is provided with a pair of drums and a pair of cables are adapted to be wound on each drum as the shaft is rotated. The cables are connected through a pulley system to the upper trailer section so that rotation of the shaft in one direction will wind the cables on the drums to raise the upper trailer section, while lowering of the upper trailer section by gravity will cause the cables to unwind.

Each drum includes a pair of end plates having holes therein and the cables are attached to the shaft and extend through the holes. This arrangement enables the cables to be wound in either direction on the drums without twisting or entangling.

The invention also includes a brake mechanism associated with the handwheel. A sprag or brake roller is mounted on a hand lever which is pivotally connected to the column on the trailer frame and the brake roller is adapted to freely ride on the periphery of the handwheel when the handwheel is turned in a direction to raise the upper trailer section. The brake roller is arranged to automatically engage the handwheel as a sprag when turning of the handwheel is stopped to thereby hold the upper trailer section in a given elevated position. By moving the brake lever to a neutral position, the handwheel can be freely rotated in either direction, and by pivoting the lever to an upper position, the brake roller is adapted to engage the periphery of the handwheel to slow down the descent of the upper trailer section.

The present invention provides an inexpensive mechanism for raising and lowering the upper trailer section of the telescopic trailer. The operating cables are connected to the shaft in a manner that eliminates any appreciable slack in the cables and yet prevents undue strain on the cables in the event of a sudden stoppage in the movement of the upper trailer section.

The brake mechanism associated with the handwheel has three separate positions. The brake will fall by gravity to a position where it enables the handwheel to be rotated to raise the upper trailer section but automatically prevents movement of the handwheel in the opposite direction. In addition, the brake can be moved to a neutral position where free rotation of the handwheel is provided, and it can also be moved to an upper position where the operator can apply light pressure to the handwheel to slow down the descent of the upper trailer section.

Other objects and advantages will appear in course of the following description.

The drawings illustrate the best mode presently contemplated of carrying out the invention.

In the drawings:

FIG. 1 is a perspective view of the telescopic high-low trailer, with parts broken away in section and incorporating the invention;

FIG. 2 is a front elevation of the handwheel in a position where the brake roller acts as a sprag to prevent rotation of the handwheel and maintain the upper trailer section in an elevated position;

FIG. 3 is a view similar to FIG. 2 showing the upper position of the brake lever for resisting counterclockwise turning of the handwheel as when lowering the telescopic upper section of the trailer;

FIG. 4 is a perspective view of the cable and drum;

FIG. 5 is a vertical section of one end of the drum;

FIG. 6 is an enlarged view taken on line 6—6 of FIG. 3; and

FIG. 7 is a schematic representation of the cable and pulley system for raising and lowering the upper trailer section.

FIG. 1 illustrates a telescopic or high-low travel trailer 1 including a lower trailer section 2 which is mounted on wheels 3. An upper trailer section 4 is adapted to telescope vertically with respect to the lower section and can be elevated from a lower transporting position to an upper camping position.

To raise and lower the upper trailer section 4, a handwheel 5 is mounted on a shaft 6 which is journaled on the upper end of a column 7 supported on the frame 8 of the lower trailer section 3. Shaft 6 carries a sprocket 9, and a chain 10 connects the sprocket 9 with a second sprocket 11 on the forward end of a shaft 12 which extends longitudinally of the trailer beneath the lower trailer section 2. With this construction, rotation of the handwheel 5 acts to rotate the shaft 12.

As shown in FIG. 1, the shaft 12 defines a pair of drums 13 and each drum includes a pair of spaced end plates 14. A cable 15 extends through a hole 16 in each end plate 14 and is adapted to be wound on the drum 13 as the shaft 12 rotates in a clockwise direction to raise the upper trailer section 4. The end of each cable 15 is attached to the end of an adjusting screw 17 which is threaded within a lug 18 welded to the shaft 12. The screw 17 is maintained in position with respect to lug 18 by a pair of lock nuts 19. By threaded adjustment of the screw 17, the position of the end of the corresponding cable 15 can be varied so that the length of each of the cables 15 associated with each drum 13 is approximately equal, enabling the upper trailer section 4 to be raised and lowered uniformly.

As shown in FIG. 1, each of the cables 15 is guided over a pair of pulleys 20 and 21 attached to the bottom of lower trailer section 2 and over a pulley 22 mounted on the upper edge of the lower trailer section. The end of each cable 15 is dead ended on the lower edge of the upper trailer section as indicated by 22a.

In the fully lowered position of the upper trailer section 4, the cables 15 are fully extended and are not wound on the drums 13, but instead pass directly from the holes 16 to the pulleys 20, as shown in FIG. 4.

As the handwheel 5 is rotated in a clockwise direction, the cables 15 are wound on the drums 13 to thereby raise the upper trailer section 4 with respect to the lower section. Rollers, not shown, are provided on the sides of the upper trailer section 4 and ride in vertical guide tracks secured to the outer surface of the lower trailer section to guide the upper trailer section in telescopic movement.

As the cables 15 extend axially through the holes 16 in the end plates 14 of drum 13, the cables can be wound in either direction on the drum. This feature prevents slackening of the cables when the upper trailer section is lowered rapidly and thereby prevents entanglement of the cables. For example, as the upper trailer section descends, the cables will unwind and the shaft 12 will rotate in a counterclockwise direction. When the upper section hits the stops on the lower trailer section to terminate the descent, the shaft 12 will continue to rotate through inertia. However, continued rotation of the shaft will not cause the cables to slacken, for the cables will merely wind up on the drum in the reverse direction to maintain the cables in a taut condition. Winding of the cables 15 in the reverse direction will act to raise the upper trailer section slightly, but as the brake is released the upper section will fall by gravity to its fully lowered position. This feature prevents the cables from slackening and maintains them in proper alinement on the drums.

To hold the upper trailer section in a given position a brake mechanism is employed which includes a brake lever 23 pivoted at 24 to a generally triangular shaped extension 25 on one side of the column 7. The lever 23 is provided with a brake or sprag roller 26 mounted adjacent to handle end 27 of the lever. Pivoting of lever 23 moves the roller 26 through an arc which intersects the circle of rotation of the handwheel at two locations. When the lever pivots by gravity to a lower position, as shown in FIG. 2, the roller 26 will engage the periphery of the handwheel 5 and when the lever 23 is pivoted upwardly, the roller 26 will also engage the handwheel 5, as shown in FIG. 3.

To provide a safety lock, a pin 29 can be inserted through one of a series of holes 30 formed in the upper curved section 31 of extension 25. The pin is positioned inwardly of the wheel 5 and U-shaped retaining wire 32 which is attached to the head of the pin, extends over the wheel and is engaged with the inner end of the pin as shown in FIG. 6. The pin 29 will prevent rotation of wheel 5 and the descent of the upper trailer section in the event the brake roller 26 is accidentally released.

In operation, when the wheel 5 is turned in a clockwise direction to raise the upper trailer section 4, the hand lever is in the relationship shown in FIG. 2 with the roller 26 riding lightly on the periphery of the wheel 5 and in no way interfering with the rotation of the wheel and winding up the cable. However, the moment the operator lets go of the wheel, or the nob 28 attached to the wheel, the roller 26 acts as a sprag or brake against turning in a counterclockwise direction, thereby maintaining the upper trailer section 4 in its raised position without the need for any auxiliary locking means.

When the operator desires to lower the upper trailer section, he merely pivots the lever 23 upwardly to a generally horizontal position, shown in phantom in FIG. 3, and the wheel 5 will then be free to turn in a counterclockwise direction. If the descent of the upper trailer section 4 is too fast, and the operator desires to slow it down, he can raise the lever 23 to the position shown in FIG. 3 applying pressure with the roller 26 on the periphery of the handwheel 5 as the situation may require. Moving the lever to the position shown in FIG. 3 to slow the descent of the upper trailer section 4 is preferred to lowering the lever 23 to the position of FIG. 2, because in that position the sprag effect would again become evident by stopping the upper trailer section in whatever intermediate position it happened to be in at the time. Once the upper trailer section 4 has returned to its fully lowered position, the operator releases the handle 27 and the lever 23 will pivot by gravity to its normal position shown in FIG. 2.

If the upper trailer section 4 descends at a fast rate, the inertia of the system may continue to rotate the shaft 12 after the upper trailer section has fully descended. Due to the cable and drum construction, the cables 15 will merely wind around the drums in the reverse direction causing the upper trailer section to begin to raise and preventing undue stress on the cable as well as preventing slack or entanglements in the cable.

The brake mechanism provides an automatic braking effect to stop and maintain the upper trailer section in any given position. In addition the brake mechanism can be moved to a neutral position in which the handwheel can rotate freely in either direction, or it can be moved to a handbraking position where it can ease the descent of the upper trailer section.

While the drawings illustrate the handwheel brake mechanism as associated with a telescopic travel trailer, it is contemplated that the handwheel brake can be utilized in any application where a rotary power transmission unit is employed to actuate a working member.

Various modes of carrying out the invention are contemplated as being within the scope of the following claims particularly pointing out and distinctly claiming the subject matter which is regarded as the invention.

I claim:

1. In a telescopic travel trailer, a lower trailer section, an upper trailer section mounted for vertical telescopic movement with respect to the lower section and movable from a lower transporting position to an upper position, a rotatable shaft, connecting means operably connecting the shaft and the upper trailer section for raising and lowering said upper section in response to rotation of said shaft, a rotatable member operably connected to said shaft and having a braking surface, a movable operating member, and friction brake means connected to said operating member and disposed to engage said braking surface to provide a braking effect, said brake means being arranged to selectively engage said braking surface at two spaced positions thereon during movement of said operating member, the engagement of said brake means with said surface at a first position acting to prevent rotation of the rotatable member in one direction and engagement of said brake means with said surface at the second of said positions acting to prevent rotation of said rotatable member in the opposite direction, said brake means being out of contact with said braking surface when in a third position to permit free rotation of said rotatable member in both directions, said braking surface being generally curved and said operating member being a lever pivotally connected to said lower trailer section, said lever being arranged so that the arc inscribed by the friction brake means during pivotal movement of said lever intersects said curved surface at said first and second positions.

2. The combination of claim 1, wherein said rotatable member is mounted for rotation about a generally horizontal axis and said first and second positions are at different vertical levels.

3. The combination of claim 1, wherein said rotatable member is a wheel mounted for rotation about a generally horizontal axis and said surface comprises the periphery of said wheel, said lever being pivotable about an axis parallel to said horizontal axis and located radially between said horizontal axis and the periphery of said wheel.

4. The combination of claim 3, wherein said lever has a handle on its outer end projecting beyond the periphery of said wheel.

5. The combination of claim 3, wherein said brake means comprises a resilient roller rotatably mounted on the lever and located outwardly of the periphery of said wheel.

6. The combination of claim 3, wherein said first location is disposed beneath a horizontal plane passing through said horizontal axis, whereby said lever will fall by gravity to said first location.

7. In a telescopic travel trailer, a lower trailer section, an upper trailer section mounted for vertical telescopic movement with respect to the lower section and movable from a lower transporting position to an upper position, a rotatable shaft, connecting means operably connecting the shaft and the upper trailer section for raising and lowering said upper section in response to rotation about a first axis of said shaft, a wheel mounted for rotation with respect to said lower trailer section and operably connected to said shaft, a lever pivotally connected to said lower trailer section and pivotable about a second horizontal axis spaced from the first axis, and friction brake means connected to said lever and disposed to engage the periphery of said wheel to provide a braking effect, said brake means being arranged to selectively engage the periphery of said wheel at two spaced positions on said periphery during pivotal movement of said lever, the engagement of said brake means with said periphery at a first of said positions acting to prevent rotation of the wheel in one direction and the engagement of said brake means with said periphery at the second of said positions acting to prevent rotation of said wheel in the opposite direction, said brake means being out of contact with said periphery when said brake means is located between said first and second positions to permit free rotation of said wheel in both directions.

8. The trailer of claim 7, wherein said connecting means comprises a drum connected to the shaft with said drum including a pair of spaced end members, each of said end members having a hole therein spaced from the axis of said drum, and a cable having one end fixed with respect to the shaft and having the opposite end connected to the upper trailer section, said cable extending through said hole, rotation of said wheel in one direction acting to rotate said shaft to wind the cable on said drum to raise the upper trailer section with respect to the lower trailer section.

9. The structure of claim 7, wherein said second axis is located between the first axis and the periphery of the wheel, the distance between said second axis and the friction brake means is greater than the spacing between said second axis and the periphery of the wheel and said distance is less than the radius of said wheel.